(12) United States Patent
Dyer

(10) Patent No.: US 9,509,894 B1
(45) Date of Patent: Nov. 29, 2016

(54) CAPTURING IMAGES USING CONTROLLED VIBRATION

(71) Applicant: Google Inc., Mountain View, CA (US)

(72) Inventor: Jonny Dyer, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/728,570

(22) Filed: Jun. 2, 2015

(51) Int. Cl.
*H04N 5/232* (2006.01)
*H04N 5/225* (2006.01)
*G01C 11/02* (2006.01)
*G06K 9/00* (2006.01)
*G06K 9/20* (2006.01)

(52) U.S. Cl.
CPC ........... *H04N 5/23203* (2013.01); *G01C 11/02* (2013.01); *G06K 9/00791* (2013.01); *G06K 9/20* (2013.01); *H04N 5/2251* (2013.01)

(58) Field of Classification Search
CPC .................................................... H04N 5/2328
USPC .............................. 348/208.7, 208.99, 208.2
See application file for complete search history.

(56) References Cited

U.S. PATENT DOCUMENTS

| | | | |
|---|---|---|---|
| 6,441,776 B1 | 8/2002 | Hein et al. | |
| 8,243,151 B2 | 8/2012 | Tabuchi | |
| 2005/0140793 A1* | 6/2005 | Kojima | H04N 5/23287 348/208.99 |
| 2011/0193977 A1 | 8/2011 | Yamada et al. | |
| 2014/0327789 A1* | 11/2014 | Tsuchiya | H04N 5/23258 348/208.11 |

* cited by examiner

*Primary Examiner* — Joel Fosselman
(74) *Attorney, Agent, or Firm* — Dority & Manning, P.A.

(57) ABSTRACT

Systems and methods of capturing imagery are provided. In particular, vibration can be induced in an imaging platform to eliminate blur in one or more images captured by the imaging platform. For instance, vibration having one or more predetermined characteristics can be induced in the imaging platform. The induced vibration can correlate to a sine wave. A collect period can then be identified corresponding to at least a portion of the period of the sine wave wherein the line of sight of the imaging platform approximates an ideal line of sight for eliminating relative motion between the imaging platform and a region of interest. One or more images of the region of interest can be captured by the imaging platform during the collect period. The one or more captured images can then be sent to a remote computing device for processing.

18 Claims, 4 Drawing Sheets

US 9,509,894 B1

CAPTURING IMAGES USING CONTROLLED VIBRATION

FIELD

The present disclosure relates generally to imaging and more particularly to controlling a position of an image capture device using vibrations.

BACKGROUND

Capturing high precision images of geographic regions, and providing the images to interested parties has become a popular service in recent years. Such images can be of interest to a wide variety of individuals and organizations, including geographers, researchers, meteorologists, scientists, map service providers, government agencies, amateur photography enthusiasts, etc. Such images can be captured, for instance, using image capture devices mounted on air-based vehicles, such as satellites or aircrafts, or ground-based vehicles, such as automobiles. The image capture devices can capture images of a scene as the vehicle travels along a path. The captured images can then be sent to a remote computing device (e.g. a server) for processing to generate one or more processed images.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of capturing imagery. The method includes identifying, by one or more computing devices, one or more vibration characteristics for an imaging platform. The method further includes inducing, by the one or more computing devices, vibration in the imaging platform causing at least a portion of the imaging platform to move about a reference point according to the one or more vibration characteristics. The method further includes identifying, by the one or more computing devices, a collect period. The collect period corresponds to a period of time wherein motion of a region of interest relative to the imaging platform is reduced. The method further includes controlling, by the one or more computing devices, a collection of data by one or more image capture devices based at least in part on the collect period.

Other example aspects of the present disclosure are directed to systems, apparatus, tangible, non-transitory computer-readable media, user interfaces, memory devices, and electronic devices for capturing imagery.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
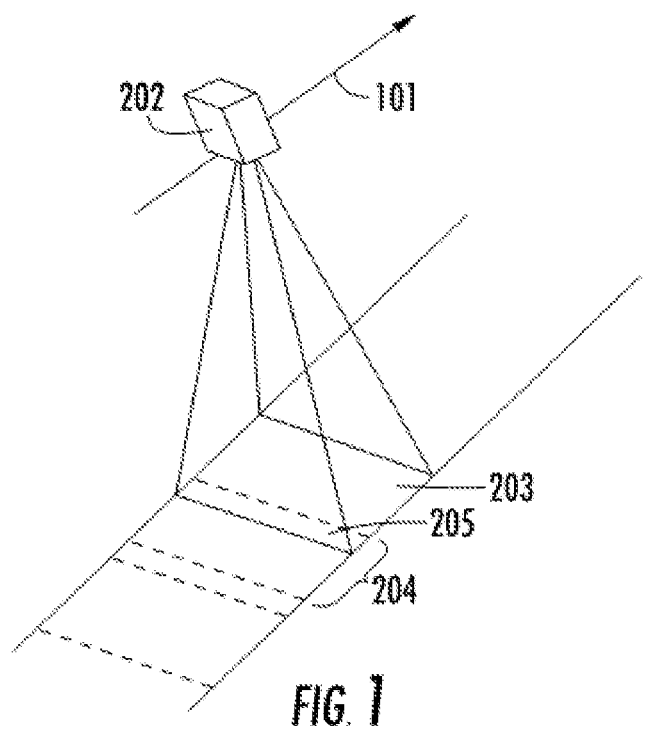
FIG. 1 depicts an example imaging platform according to example embodiments of the present disclosure.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

OVERVIEW

Example aspects of the present disclosure are generally directed to capturing geographic imagery. More particularly, example aspects of the present disclosure are directed to compensating for blur in images caused by the motion of a region of interest relative to an image capture device configured to capture one or more images of the region of interest. For instance, an image capture device can be located on an imaging platform traveling at various speeds. The imaging platform can be an overhead imaging platform, such as a satellite, an airplane, a helicopter, an unmanned aerial vehicle (UAV), a drone, a balloon, etc. In alternative embodiments, the imaging platform can be a ground-based vehicle, such as an automobile. The relative motion between the region of interest and the imaging platform can introduce blur and/or distortions into images captured by the image capture devices, which can cause a low signal-to-noise ratio in the images.

Various conventional techniques have been used to eliminate or reduce such relative motion and thereby to eliminate or reduce blur and/or distortions in images. For instance, such techniques can include slewing the imaging platform against the relative motion. As another example, techniques for reducing relative motion can include introducing complex optical elements such as fast scan mirrors, sensors configured to provide adaptive optics, or custom sensors, such as time-delayed integration (TDI) charge-coupled devices. Such techniques can be inefficient and/or operationally expensive.

According to example embodiments of the present disclosure, controlled vibration can be introduced in an imaging platform to eliminate or reduce the effects of relative motion in an image captured by the imaging platform. As used herein, "relative motion" can be defined as the motion of a moving or stationary object in relation to another moving or stationary object. The imaging platform can be configured to capture one or more images in a field of view of the imaging platform while traveling at various velocities. The vibration can be induced in an image capture device associated with the imaging platform using one or more mechanical actuators mounted in various locations on the image capture device and/or the imaging platform. In example embodiments, the induced vibration dynamics of the image capture device can be used to eliminate or reduce blur in the captured images caused by relative motion between the imaging platform and the field of view.

In particular, the image capture device can be designed to have predetermined vibration characteristics. The predetermined vibration characteristics can correspond to vibration modes (e.g. eigenmodes) of the image capture device. In example embodiments, the vibration characteristics can provide a sinusoidal, or near sinusoidal, vibration of the image capture device, such that the vibration corresponds to a sine wave having a frequency and amplitude. In particular, the sinusoidal vibration can cause the image capture device to oscillate around a reference position in a periodic manner (e.g. in accordance with a sine wave). The frequency of the vibration can be determined based at least in part on a frame rate of an image capture device of the imaging platform. In example embodiments, the frequency can be an integer multiple of the frame rate. For instance, if the image capture device operates at 50 frames per second (fps), the frequency can be determined to be 50 hertz (Hz), 100 Hz, 150 Hz, etc.

In example embodiments, a frequency can be selected to facilitate a desired collect period. A collect period can be a period of time relative to the sine wave wherein relative motion between a line of sight of the image capture device and the region of interest is reduced or eliminated. In particular, the collect period can be a period of time wherein the sine wave approximates an ideal line of motion for eliminating relative motion.

In example embodiments, once the frequency is determined, the amplitude of the vibration (e.g. of the sine wave) can be determined based at least in part on the frequency and the relative motion. In particular, given the frequency, the amplitude can be determined such that the sine wave approximates the ideal line of motion for the duration of the desired collect period. In example embodiments, the amplitude can be derived using a secant method, a tangent method, a least squares method, and/or various other suitable methods.

The amplitude of the vibration can correspond to an angular displacement of the imaging platform. The line of sight of the image capture device can change with the displacement of the image capture device. For instance, the change in the line of sight can correspond to the angle of displacement caused by the vibration. The amplitude of the vibration can further correspond to a scan rate of the image capture device.

The mechanical actuators can apply forces and/or a torques to the image capture device and/or the imaging platform to facilitate the desired amplitude. In particular, the mechanical actuators can leverage the resonant gain of the imaging platform to induce the desired amplitude. When the actuators drive the image capture device in accordance with the desired frequency (e.g. the desired vibration mode), the torque required to induce the desired amplitude can be much smaller than when the actuators drive the image capture device outside the desired frequency. For instance, leveraging the vibration modes of the image capture device can facilitate a reduction in required input actuation force of between about 10 times to 100 times what would otherwise be required.

In example embodiments, the image capture device can be configured to collect data at suitable times as the image capture device vibrates about the reference point. In particular, the image capture device can be configured to collect data during at least one identified collect period. For instance, during a collect period, the image capture device can open a shutter of the image capture device and collect one or more images. Once the collect period expires, the shutter can be closed until another collect period. In example embodiments, the collected data can include one more images captured in succession, such that neighboring images contain overlapping measurements of a region of interest. The captured images can then be sent to a remote computing device (e.g. server) for processing. In example embodiments, the processing can include registering neighboring images and reconstructing an image of the region of interest, for instance, using a mosaicing technique. It will be appreciated that various other suitable image collection and processing techniques can be used without deviating from the scope of the present invention.

Example Imaging Platforms

FIG. 1 depicts an example imaging platform according to example embodiments of the present disclosure. In particular, FIG. 1 depicts an imaging satellite 202 having an optical payload comprising one or more image capture devices. Imaging satellite 202 can travel in a path over a region of interest. The path may include one or more straight lines or segments, or may be a curved path. Imaging satellite 202 can be flown at a height over the region of interest. Image samples can be obtained during the travel of the satellite and can be assembled into an output image, for instance, at a server on the ground via digital processing. Imaging satellite 202 may be configured to capture panchromatic and/or multispectral data using the one or more image capture devices. Imaging satellite 202 may be configured to collect image samples over multiple spectral channels. For instance, imaging satellite 202 may include a two-dimensional (2D) staring sensor that can be configured to obtain a two-dimensional image frame 203 in a single snapshot.

In example embodiments, the imaging satellite 202 may be configured to capture a plurality of image frames 203, 204 in succession, each having at least some amount of overlap 205 with one or more neighboring image frames (e.g. image frames immediately before or after the image frame). In example embodiments, the staring sensor can comprise a complementary metal-oxide-semiconductor (CMOS) sensor and/or a charge coupled device (CCD) sensor. The staring sensor can include an array of photodiodes. In some embodiments, the staring sensor can further include an active-pixel sensor (APS) comprising an integrated circuit containing an array of pixel sensors. Each pixel sensor can include a photodiode and an active amplifier. In further example embodiments, the staring sensor (and/or other components of an overhead imaging platform) may be radiation hardened to make it more resistant to damage from ionizing radiation in space.

It will be appreciated that various other suitable sensors associated with the image capture devices may be used to capture the image samples as the imaging platform travels along the path over the region of interest. Such sensors can include, for instance, line scan sensors, time delay integration (TDI) sensors, color wheel type 2D staring sensors, and color filter array (CFA) sensors. It will be further appreciated that various suitable image capture techniques can be used to capture images using the various sensors.

Figure 2:
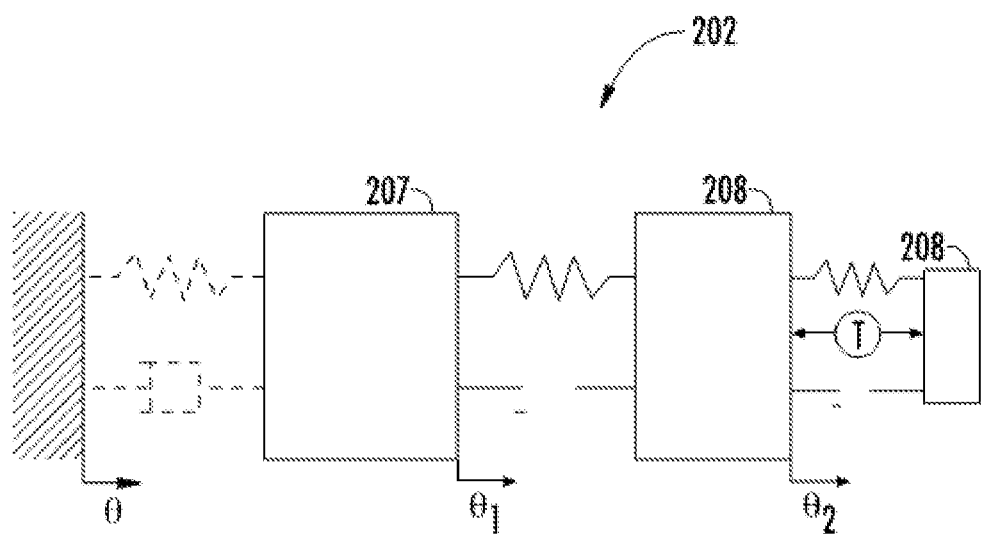
FIG. 2 depict an example imaging platform having one or more mechanical actuators according to example embodiments of the present disclosure.

As indicated above, as imaging satellite 202 travels along the path, the relative motion of the region of interest can cause blur and/or distortions in an image captured by imaging satellite 202. According to example embodiments, such blur can be reduced or eliminated by inducing vibration in the optical payload of imaging satellite 202 in accordance with a predetermined natural vibration of the optical payload. The induced vibration can have one or more predetermined vibration characteristics, and can be implemented using one or more mechanical actuators associated with imaging satellite 202. For instance, FIG. 2 depicts an example actuator implementation in an imaging platform according to example embodiments of the present disclosure. In particular, FIG. 2 depicts a block diagram of imaging satellite 202 having a platform bus 207, and an associated optical payload 209. Optical payload 209 can have one or more mechanical actuators 208 mounted in various suitable locations on optical payload 209. For instance actuators 208 may be mounted to a back structure, a deck structure, between optical payload 209 and the payload deck structure, and/or in various other suitable positions. Actuators 208 may be configured to induce vibration in optical payload 209 by applying a torque to optical payload 209.

In alternative embodiments, actuators 208 may be positioned inline with one or more mechanical struts of optical payload 209. In such embodiments, actuators 208 may apply a torque directly to optical payload 209 through the struts. It will be appreciated that actuators 208 may be any suitable actuator configured to induce vibration in optical payload 209.

As indicated above, actuators 208 may be configured to induce vibration in optical payload 209. The induced vibration can be a sinusoidal or near sinusoidal vibration having an amplitude and a frequency (e.g. vibration characteristics). In example embodiments, one or more motion sensors associated with optical payload 209 can be used to monitor the motion of optical payload 209. For instance, the motion sensors can include various suitable accelerometers, gyroscopes, and/or relative position (e.g. capacitive, inductive) sensors used to create a feedback loop to monitor the motion of the optical payload as the optical payload moves in accordance with the induced vibration characteristics.

Figure 3:
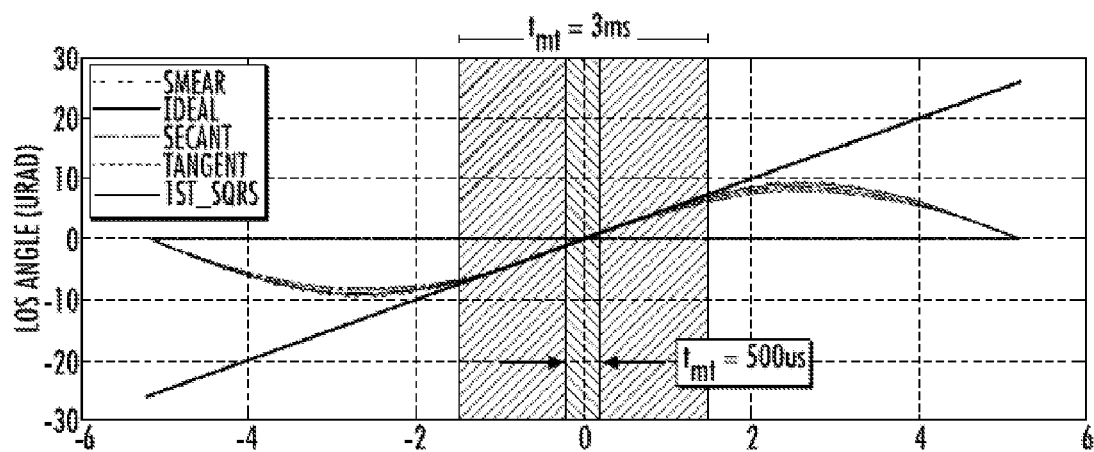
FIG. 3 depicts a plot of example line of sight angles of an imaging platform according to example embodiments of the present disclosure.

FIG. 3 depicts a chart of example motion plots of an example optical payload according to example embodiments of the present disclosure. For instance, the optical payload may be optical payload 209, or various other suitable optical payloads. In particular, FIG. 3 depicts sine waves having a frequency and an amplitude derived using least squares, secant, and tangent techniques. FIG. 3 further depicts an "ideal" line corresponding to an ideal line of sight angle of optical payload 209 for eliminating relative motion, and a "smear" line corresponding to a zero degree line of sight angle (e.g. looking directly downward). The "ideal" line can be derived at least in part from the motion of the region of interest relative to imaging satellite 202, such that the relative motion is counteracted by the changing line of sight angle. For instance, the change in the line of sight angle as specified by the "ideal" line can correspond to the relative motion of the region of interest, such that the line of sight moves at the same rate as the region of interest.

The frequency of vibration can be selected based at least in part on the "ideal" line. For instance, a frequency can be chosen such that the motion of optical payload 209 approximates the "ideal" line for a desired amount of time. As shown, between about −1.5 milliseconds (ms) and about 1.5 ms, the sine waves approximate the "ideal" line. As used herein, the term "about," when used in reference to a numerical value, is intended to refer to within 40% of the numerical value. During this time period ($t_{int}$), the sinusoidal motion of optical payload 209 can provide reduced relative motion of the region of interest for capturing images. Accordingly, during $t_{int}$, one or more image capture devices of optical payload 209 can be configured to capture one or more images of the region of interest. As the motion of optical payload 209 moves outside of $t_{int}$, the image capture devices can be configured to cease capturing images.

The frequency of vibration of optical payload 209 is inversely proportional to the duration of $t_{int}$. As indicated above, the frequency of the vibration can further be determined to correspond to a given frame rate of optical payload 209. For instance, the frequency can be an integer multiple of the frame rate. In example embodiments, a frequency can be chosen to facilitate a maximum $t_{int}$ for the given frame rate within the physical constraints of imaging satellite 202 and/or optical payload 209. For instance, as shown in FIG. 3, the duration of $t_{int}$ is 3 ms.

The induced vibration in optical payload 209 can cause optical payload 209 to oscillate about the "smear" line. The amplitude of the sine waves can correspond to a line of sight displacement of optical payload 209. As indicated above, the amplitude of the vibration can be derived from the frequency of the sine wave and the "ideal line" using a secant technique, a tangent technique, and/or a least squares technique. In particular, given the frequency, the amplitude can be derived such that the sine wave approximates the "ideal" line for the desired $t_{int}$. For instance, as depicted, the line of sight angle of optical payload 209 can oscillate between about 10 microradians and about −10 microradians.

Figure 4:
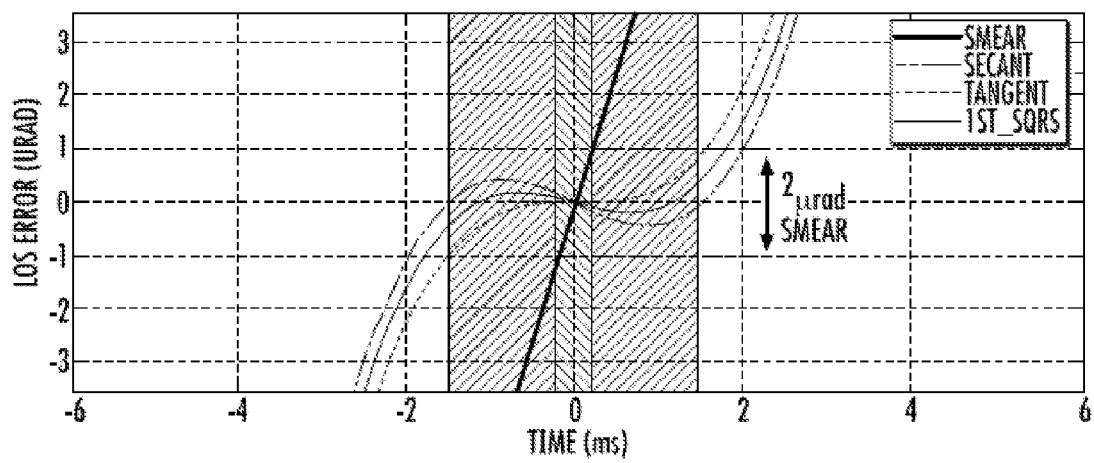
FIG. 4 depicts a plot of example line of sight angle errors according to example embodiments of the present disclosure.

FIG. 4 depicts a chart of example line of sight errors of optical payload 209 according to example embodiments of the present disclosure. The line of sight errors can correspond to a deviation of the motion plots depicted in FIG. 3 (e.g. the sine waves and the "smear" line) from the "ideal" line depicted in FIG. 3. The line of sight errors can be derived by subtracting the motion plots from the "ideal" line. As shown, for each motion plot, the line of sight error approaches zero near zero-time.

As indicated above, one or more collect periods (e.g. $t_{int}$) can be identified, during which images can be captured. For instance, optical payload 209 can be controlled to capture images only during the collect periods. Each collect period can correspond to a period of time relative to the motion plot of optical payload 209 wherein the line of sight error is less than a predetermined threshold. In particular, a line of sight error can correspond to smear in a captured image. The predetermined threshold can correspond to a line of sight error providing less than a specified amount of smear. As depicted, the threshold can correspond to a line of sight error providing less than 2 microradians of smear. It will be appreciated that various other suitable thresholds can be used without deviating from the scope of the present disclosure.

Example Methods of Capturing Imagery

Figure 5:
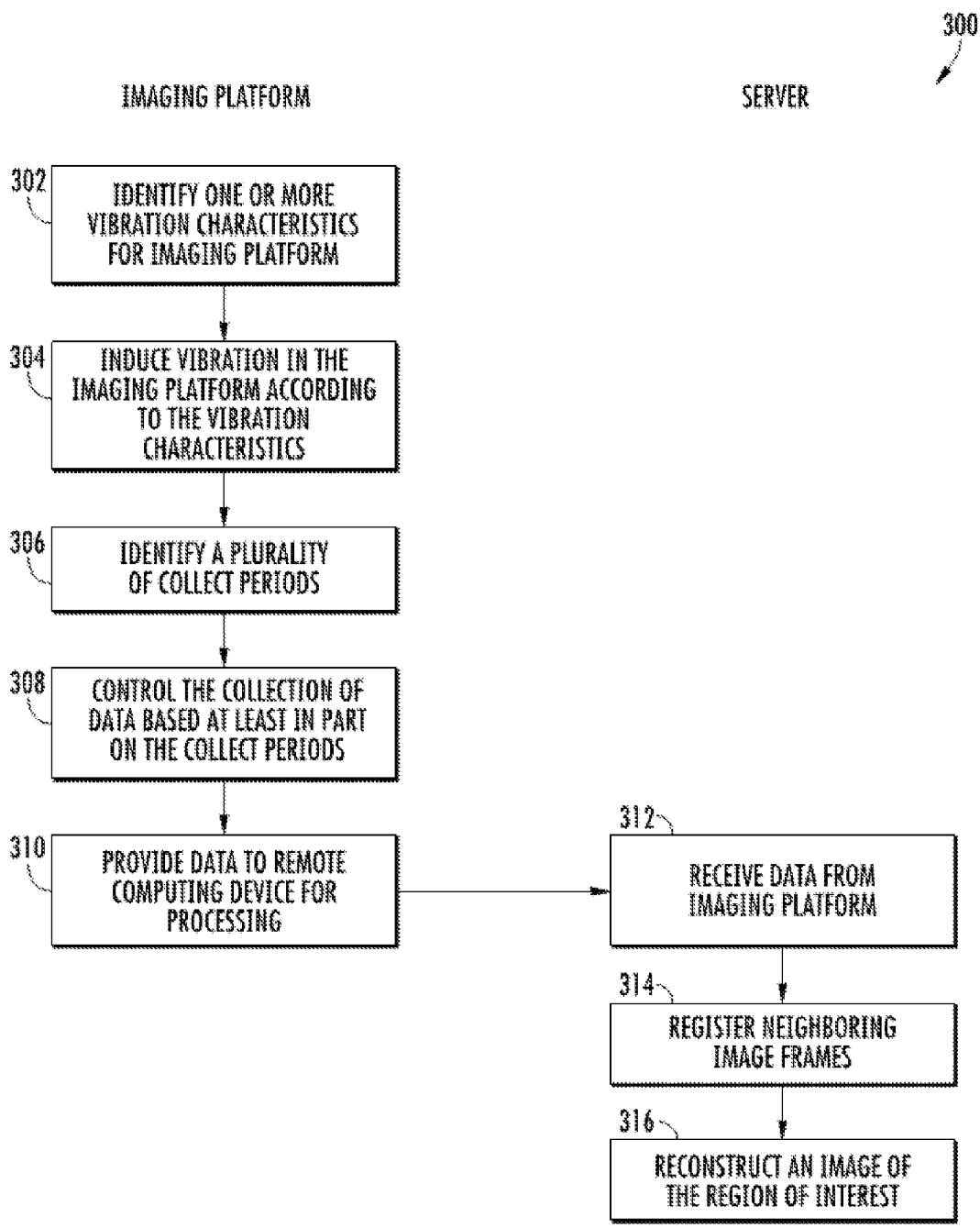
FIG. 5 depicts a block diagram of an example method of capturing one or more images according to example embodiments of the present disclosure.

FIG. 5 depicts a flow diagram of an example method (300) of capturing imagery according to example embodiments of the present disclosure. The method (300) can be implemented by one or more computing devices. In addition, FIG. 5 depicts steps performed in a particular order for purposes of illustration and discussion. Those of ordinary skill in the art, using the disclosures provided herein, will understand that various steps of any of the methods disclosed herein can be modified, omitted, rearranged, expanded, repeated and/or adapted in various ways without deviating from the scope of the present disclosure.

At (302), method (300) can include identifying, by an imaging platform, one or more vibration characteristics for the imaging platform. For instance, imaging platform can be imaging satellite 202 or various other suitable imaging platforms, such as a satellite, airplane, helicopter, unmanned aerial vehicle, drone, balloon, ground-based vehicle etc. The vibration characteristics can comprise a frequency and an amplitude, such that the vibration corresponds to a sine wave, or a summation of sine waves. The vibration characteristics can be determined based at least in part on the relative motion between the imaging platform and a region of interest of which one or more images can be obtained.

As described above, relative motion between a line of sight of the imaging platform and a region of interest can be reduced or eliminated by changing the line of sight angle of the imaging platform in accordance with an ideal line of motion. The ideal line of motion can be determined at least in part from the relative motion of the region of interest. In example embodiments, the vibration characteristics can be determined based at least in part on the ideal motion. For instance, a frequency can be identified such that the sine wave approximates the ideal motion for a desired amount of time (e.g. a desired collect period).

In example embodiments, the frequency of the vibration can further correspond to a frame rate at which images are to be captured. For instance, the frequency can be an integer multiple of the frame rate. The amplitude of the vibration can then be derived at least in part from the frequency and the relative motion using a least squares, secant, and/or tangent technique. In particular, the amplitude of the vibration can correspond to an angular displacement of a line of sight of the one or more image capture devices. The amplitude can be determined such that the line of sight approximates the ideal motion for the desired amount of time.

At (304), method (300) can include inducing vibration in the imaging platform according to the vibration characteristics. The vibration can be induced at least in part by one or more mechanical actuators associated with the imaging platform. For instance, the mechanical actuators can be controlled by a controller to apply a torque to the imaging platform, which causes vibration in the imaging platform. The induced vibration in the imaging platform can cause at least a portion (e.g. image capture device) of the imaging platform to move about a reference point. The motion of the imaging platform can be monitored by one or more sensors associated with the imaging platform (e.g. accelerometers, gyroscopes, and/or relative position (e.g. capacitive, inductive) sensors).

As indicated above, the amount of force applied by the mechanical actuators to facilitate the desired amplitude can depend on the frequency with which the force is applied. For instance, when the torque is applied at the identified frequency, the amount of force required can be between about 10 times to 100 times less than the force required when applied outside the identified frequency. In this manner, the resonant gain of the imaging platform can be leveraged to facilitate the desired amplitude.

At (306), method (300) can include identifying a plurality of collect periods. As described above, a collect period can be, for instance, a subset of the period of the sine wave. In particular, a collect period can correspond to the period of time wherein the motion of an image capture device (and the corresponding line of sight) of the imaging platform is within a threshold range of the ideal motion. For instance, the threshold range can correspond to a line of sight error of two microradians.

A collect period can periodically repeat in accordance with the oscillations of the sine wave. In example embodiments, as the image capture device vibrates in accordance with the induced vibration, the plurality of collect periods can be identified using the various motion sensors associated with the imaging platform that monitor the motion of the image capture device. For instance, the motion sensors can determine the period of time wherein the motion of the image capture device is within the threshold range of the ideal motion.

At (308), method (300) can include controlling the collection of data of one or more image capture devices associated with the imaging platform based at least in part on the plurality of collect periods. For instance, the image capture devices can be controlled such that images are captured only during at least a subset of the plurality of collect periods, and not outside the collect periods. In particular, the images can be captured by opening and closing a shutter associated with the image capture devices and by using various suitable frame rates. For instance, images can be captured at a particular frame rate while the shutter is open (e.g. during at least a subset of the collect periods). In example embodiments, one or more images can be captured in succession such that neighboring images contain overlapping measurements of the region of interest.

At (310), method (300) can include providing data (e.g. the captured images) to a remote computing device (e.g. server) for processing, and at (312), method (300) can include receiving the data from the imaging platform. The server can use various suitable image processing techniques to generate one or more processed images. For instance, at (314), method 300 can include registering, at the server, neighboring image frames. At (316), method (300) can include reconstructing, at the server, a more accurate image of the region of interest based at least in part on the registered image frames. In example embodiments, the server can reconstruct the images using a mosaicing technique. In this manner, the final reconstructed image can correct for deviations in the motion of the imaging platform from the expected direction of travel, including deviations in frequency or amplitude of the vibration characteristics.

Example Systems for Capturing Imagery

Figure 6:
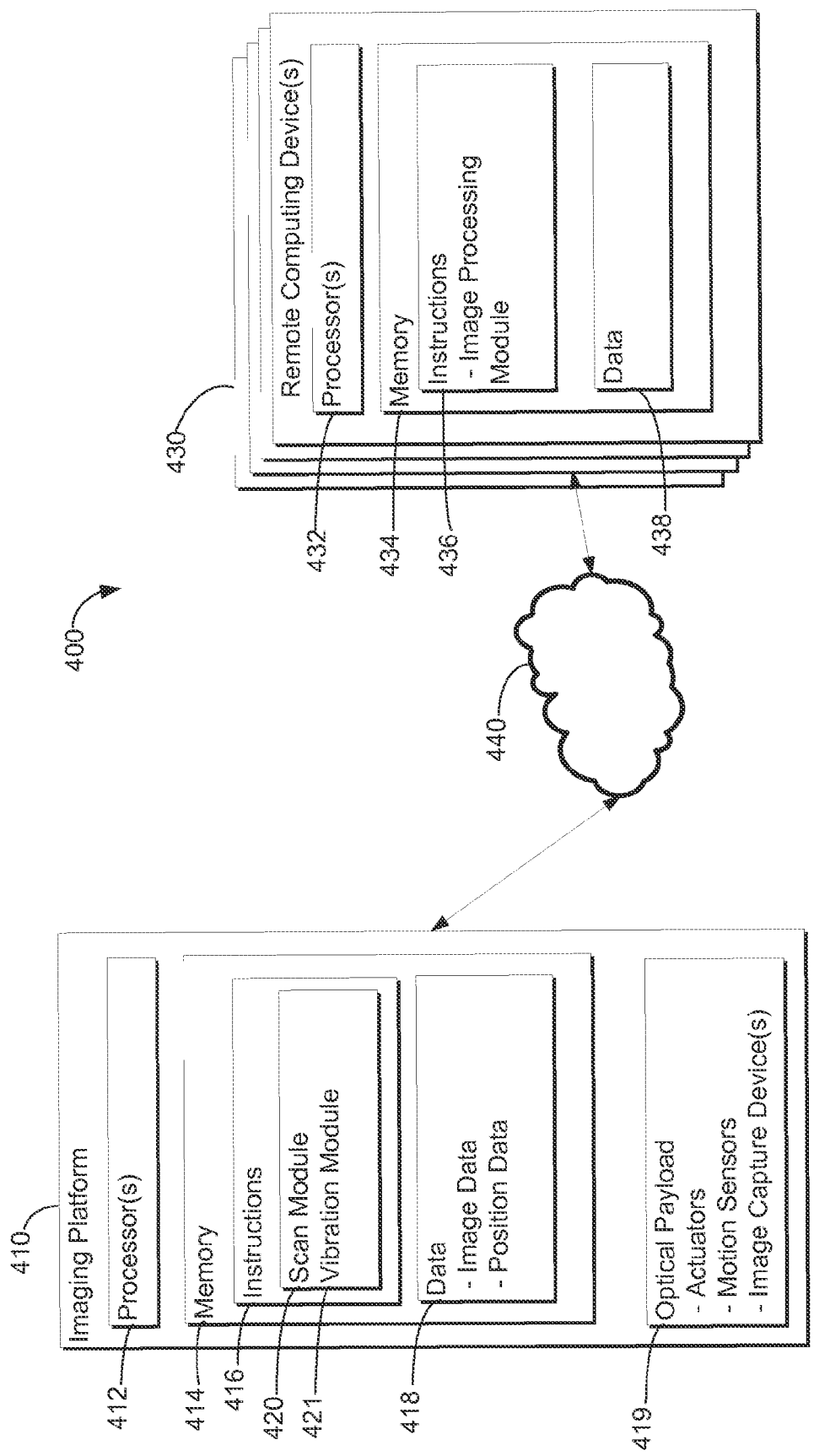
FIG. 6 depicts an example system for capturing one or more images according to example embodiments of the present disclosure.

FIG. 6 depicts a computing system 400 that can be used to implement the methods and systems for capturing imagery according to example embodiments of the present disclosure. System 400 can be implemented using a client-server architecture that includes an imaging platform 410 that can communicate with one or more remote computing devices 430 (e.g. servers) over a network 440. System 400 can be implemented using other suitable architectures, such as a single computing device.

Imaging platform 410 can be any suitable type of imaging platform, such as a satellite, airplane, helicopter, unmanned aerial vehicle (UAV), drone, balloon, ground-based vehicle, etc. Imaging platform 410 can include one or more processor(s) 412 and one or more memory devices 414.

The one or more processor(s) 412 can include any suitable processing device, such as a microprocessor, microcontroller, integrated circuit, logic device, one or more central processing units (CPUs), graphics processing units (GPUs)

dedicated to efficiently rendering images or performing other specialized calculations, and/or other processing devices. The one or more memory devices 414 can include one or more computer-readable media, including, but not limited to, non-transitory computer-readable media, RAM, ROM, hard drives, flash drives, or other memory devices. In alternative embodiments, the systems and method provided herein may be implemented using analog circuitry. For instance, analog circuitry (or a combination of analog and digital circuitry) may be used to induce vibration in imaging platform 410 in accordance with example embodiments of the present disclosure.

The one or more memory devices 414 store information accessible by the one or more processors 412, including instructions 416 that can be executed by the one or more processors 412. For instance, the memory devices 414 can store instructions 416 for implementing a scan module 420 configured to scan a region of interest and capture one or more images. The memory devices 414 can further store instructions 416 for implementing a vibration module 421. Vibration module 421 can be configured to identify one or more vibration characteristics and induce vibration in imaging platform 410 causing at least a portion of imaging platform 410 to vibrate according to the one or more vibration characteristics. In example embodiments, the vibration can be induced using one or more mechanical actuators associated with imaging platform 410. The one or more mechanical actuators can be controlled, for instance, by a controller configured to provide command signals to the mechanical actuators.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk or optical or magnetic media. When software is used, any suitable programming language or platform can be used to implement the module.

The one or more memory devices 414 can also include data 418 that can be retrieved, manipulated, created, or stored by the one or more processors 412. The data 418 can include, for instance, image data, position data, and other data.

Imaging platform 410 can further include an optical payload 419. Optical payload 419 can be configured to capture one or images of a region of interest, and can include one or more actuators mounted on optical payload 419, one or more motion sensors, and one or more image capture devices.

Imaging platform 410 can also include a network interface used to communicate with one or more remote computing devices (e.g. remote computing device 430) over the network 440. The network interface can include any suitable components for interfacing with one more networks, including for example, transmitters, receivers, ports, controllers, antennas, or other suitable components.

The system 400 includes a remote computing device 430, such as a web server. Remote computing device 430 can host or be configured to receive one or more images from imaging platform 410 and process the images to generate one or more processed images. Remote computing device 430 can be implemented using any suitable computing device(s). The server 430 can have one or more processors 432 and memory 434. The memory 434 can store instructions 436 and data 438. For instance, the memory 434 can store instructions for implementing an image processing module. The server 430 can also include a network interface used to communicate with imaging platform 410 over the network 440. The network interface can include any suitable components for interfacing with one more networks, including for example, transmitters, receivers, ports, controllers, antennas, or other suitable components.

The network 440 can be any type of communications network, such as a local area network (e.g. intranet), wide area network (e.g. Internet), cellular network, or some combination thereof. The network 440 can also include a direct connection between imaging platform 410 and remote computing device 430. In general, communication between remote computing device 430 and imaging platform 410 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of capturing imagery, the method comprising:

identifying, by one or more computing devices, vibration characteristics for an imaging platform, the vibration characteristics associated with an amplitude and a frequency of a sine wave, the frequency of the sine wave being determined based at least in part on a frame rate associated with one or more image capture devices associated with the imaging platform;

inducing, by one or more computing devices, vibration in the imaging platform causing at least a portion of the imaging platform to move about a reference point according to the vibration characteristics;

identifying, by the one or more computing devices, a collect period corresponding to a period of time wherein motion of a region of interest relative to the imaging platform is reduced; and controlling, by the one or more computing devices, a collection of data by the one or more image capture devices based at least in part on the collect period.

2. The computer-implemented method of claim 1, wherein the induced vibration causes a line of sight of the one or more image capture devices to change in accordance with the sine wave.

3. The computer-implemented method of claim 1, wherein the frequency is determined to be an integer multiple of the frame rate.

4. The computer-implemented method of claim 1, wherein the amplitude of the sine wave corresponds to an angular displacement of the one or more image capture devices.

5. The computer-implemented method of claim 1, wherein the amplitude of the sine wave is derived at least in part using a least squares technique, a secant technique, or a tangent technique.

6. The computer-implemented method of claim 1, wherein controlling the collection of data comprises capturing one or more images during the collect period using the one or more image capture devices.

7. The computer-implemented method of claim 6, wherein controlling the collection of data further comprises closing a shutter associated with the one or more image capture devices outside of the collect period, such that no images are captured outside of the collect period.

8. The computer-implemented method of claim 7, wherein controlling the collection of data comprises capturing a plurality of images of the region of interest, the plurality of images being captured in succession, such that neighboring images contain overlapping measurements of the region of interest, and wherein the computer-implemented method further comprises providing, by the one or more computing devices, the plurality of captured images to a remote computing device for processing, wherein the processing comprises registering neighboring imaging frames and reconstructing an image of the region of interest.

9. The computer-implemented method of claim 1, wherein the vibration in the imaging platform is induced at least in part using one or more mechanical actuators associated with the imaging platform.

10. The computer-implemented method of claim 9, wherein the one or more computing devices comprise a controller configured to control the one or more mechanical actuators.

11. The computer-implemented method of claim 1, wherein the collect period corresponds to the time wherein a line of sight angle of the one or more image capture devices is within a threshold range of an ideal line of sight angle for eliminating relative motion.

12. The computer-implemented method of claim 1, wherein the imaging platform comprises one of a satellite, airplane, helicopter, unmanned aerial vehicle, drone, or balloon.

13. The computer-implemented method of claim 1, further comprising providing the collected data to a remote computing device for image processing.

14. An imaging platform, comprising:
one or more image capture devices;
one or more memory devices; and
one or more processors, the processors storing computer-readable instructions that when executed by the one or more processors cause the one or more processors to perform operations, the operations comprising:

identifying vibration characteristics for the imaging platform, the characteristics associated with an amplitude and a frequency of a sine wave, the frequency of the sine wave being determined based at least in part on a frame rate associated with the one or more image capture devices;
inducing vibration in the imaging platform causing at least a portion of the imaging platform to move about a reference point according to the vibration characteristics;
identifying at least one collect period, each collect period corresponding to a period of time wherein motion of a region of interest relative to the imaging platform is within a target range; and
controlling a collection of data by the one or more image capture devices based at least in part on the at least one collect period.

15. The imaging platform of claim 14, wherein controlling the collection of data comprises capturing images of the region of interest only during the at least one collect period.

16. The imaging platform of claim 14, wherein controlling the collection of data comprises capturing a plurality of images of the region of interest during the at least one collect period, the plurality of images being captured in succession, such that neighboring images contain overlapping measurements of the region of interest, and wherein the one or more operations further comprise providing the plurality of captured images to a remote computing device for processing, wherein the processing comprises registering neighboring imaging frames and reconstructing an image of the region of interest.

17. One or more tangible, non-transitory computer-readable media storing computer-readable instructions that when executed by one or more processing devices cause the one or more processing devices to perform operations, the operation comprising:
identifying vibration characteristics for an imaging platform, the vibration characteristics comprising a frequency, the frequency being determined based at least in part on a frame rate associated with one or more image capture devices associated with the imaging platform;
inducing vibration in the imaging platform causing at least a portion of the imaging platform to move about a reference point according to the vibration characteristics;
identifying at least one collect period, each collect period corresponding to a period of time wherein motion of a region of interest relative to the imaging platform is reduced; and
controlling a collection of data by the one or more image capture devices based at least in part on the collect period.

18. The one or more tangible non-transitory computer-readable media of claim 17, wherein the at least one collect period is identified based at least in part on a deviation of a line of sight angle of the imaging platform from an ideal line of sight angle for reducing motion of the region of interest relative to the imaging platform.

* * * * *